(12) United States Patent
Yamaura et al.

(10) Patent No.: US 11,228,230 B2
(45) Date of Patent: Jan. 18, 2022

(54) MOTOR

(71) Applicant: DENSO CORPORATION, Kariya (JP)

(72) Inventors: Kousuke Yamaura, Kariya (JP);
Yoshiki Matsushita, Kariya (JP);
Kazuto Kitou, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/050,589

(22) PCT Filed: Jun. 18, 2019

(86) PCT No.: PCT/JP2019/024044
§ 371 (c)(1),
(2) Date: Oct. 26, 2020

(87) PCT Pub. No.: WO2019/244873
PCT Pub. Date: Dec. 26, 2019

(65) Prior Publication Data
US 2021/0242754 A1    Aug. 5, 2021

(51) Int. Cl.
| | | |
|---|---|---|
| *H02K 11/02* | (2016.01) | |
| *H02K 11/026* | (2016.01) | |
| *H02K 11/38* | (2016.01) | |
| *H01R 39/38* | (2006.01) | |
| *H01R 39/46* | (2006.01) | |
| *H02K 5/14* | (2006.01) | |
| *H02K 5/22* | (2006.01) | |

(Continued)

(52) U.S. Cl.
CPC ......... *H02K 11/026* (2013.01); *H01R 39/383* (2013.01); *H01R 39/46* (2013.01); *H02K 5/148* (2013.01); *H02K 5/225* (2013.01); *H02K 7/1166* (2013.01); *H02K 11/38* (2016.01); *H01R 12/58* (2013.01); *H02K 2211/03* (2013.01)

(58) Field of Classification Search
CPC ........ H02K 11/02; H02K 11/26; H02K 5/225; H01R 39/383
See application file for complete search history.

(56) References Cited

U.S. PATENT DOCUMENTS

| | | | | |
|---|---|---|---|---|
| 6,975,059 | B2 * | 12/2005 | Sakai ................... | H01R 39/383 310/239 |
| 7,190,095 | B2 * | 3/2007 | Matsuyama ......... | H02K 7/1166 310/68 R |

FOREIGN PATENT DOCUMENTS

| | | |
|---|---|---|
| JP | 2003-133780 A | 5/2003 |
| JP | 2007-005751 A | 1/2007 |
| JP | 2015-512179 A | 4/2015 |

\* cited by examiner

*Primary Examiner* — Dang D Le
(74) *Attorney, Agent, or Firm* — Oliff PLC

(57) ABSTRACT

This motor includes a yoke housing, a brush holder, a housing case and a circuit board. The brush holder holds a power supply brush and power supply terminals. The housing case has a board containing recess into which front end portions of the power supply terminals are inserted. The circuit board has terminals which are electrically connected to the power supply terminals within the board containing recess. The power supply terminals have terminal connection parts which linearly extend and are arranged in the board containing recess. The terminals are fork terminals which are electrically connected to the terminal connection parts. With respect to the terminal connection parts, portions closer to the base ends than terminal connected positions, where the terminals are connected, are covered by noise reduction member for reducing noise.

9 Claims, 7 Drawing Sheets

(51) Int. Cl.
*H02K 7/116* (2006.01)
*H01R 12/58* (2011.01)

Fig.7

Fig.8

MOTOR

CROSS-REFERENCE TO RELATED APPLICATIONS

The present application is based on Japanese Patent Application No. 2018-117191 filed on Jun. 20, 2018 and Japanese Patent Application No. 2018-218277 filed on Nov. 21, 2018, the entire contents of which are incorporated herein by reference.

TECHNICAL FIELD

The present disclosure relates to a motor.

BACKGROUND ART

Conventional motors generate noise when a power brush slides in contact with a commutator. To reduce the noise of such a motor, a ferrite core serving as a noise reduction member can be used to cover an external cable that is connected to the motor to supply power (refer to Patent Document 1).

PRIOR ART DOCUMENT

Patent Document

Patent Document 1: Japanese Laid-Open Patent Publication No. 2007-5751

SUMMARY OF THE INVENTION

The configuration described above, however, includes the ferrite core, which is arranged outside the motor, and a ferrite core holder, which is used to fix the ferrite core. This increases the space occupied by the device that includes these components.

It is an object of the present disclosure to provide a motor that occupies less space.

A motor according to one aspect of the present disclosure includes a yoke housing (12), a brush holder (21), a housing case (41), and a circuit board (72). The tubular yoke housing, having a closed bottom, accommodates a rotor (11). The brush holder is fitted into an open portion of the yoke housing. The brush holder includes a power brush (22) that supplies power to the rotor and a power terminal (23, 24) that is electrically connected to the power brush. The housing case is coupled to the open portion of the yoke housing. The housing case includes a substrate accommodating recess (46) into which a distal end of the power terminal is inserted, and the housing case accommodates a speed reduction mechanism (31) that reduces the rotation of the rotor in speed. The circuit board is accommodated in the substrate accommodating recess and includes a terminal (73, 74) electrically connected to the power terminal inside the substrate accommodating recess. The power terminal includes a terminal connection portion (23a, 24a) that extends straight and is arranged in the substrate accommodating recess. The terminal includes a bifurcated terminal electrically connected to the terminal connection portion in a direction intersecting with a direction in which the terminal connection portion extends. The terminal connection portion includes a section that is located toward a proximal end from a terminal connection position (23b, 24b), where the terminal is connected, and covered by a noise reduction member (81, 82, 91) that reduces noise.

With this structure, the terminal connection portion includes the section that is located toward the proximal end from the terminal connection position, where the terminal of the circuit board is connected, and covered by the noise reduction member. This entirely reduces the occupied size in comparison with a noise reduction member arranged outside the motor and allows for miniaturization. This also reduces noise generated by power brushes and transmitted to the circuit board.

BRIEF DESCRIPTION OF THE DRAWINGS

The objective, other objectives, features, and advantages of the present disclosure will be clear in the detailed description below with reference to the accompanying drawings.

FIG. 7 is an enlarged view showing a housing case for a motor in a modification.

FIG. 8 is an enlarged view showing a housing case and a power terminal for a motor in the modification.

MODES FOR CARRYING OUT THE INVENTION

A motor according to one embodiment will now be described.

Figure 1:
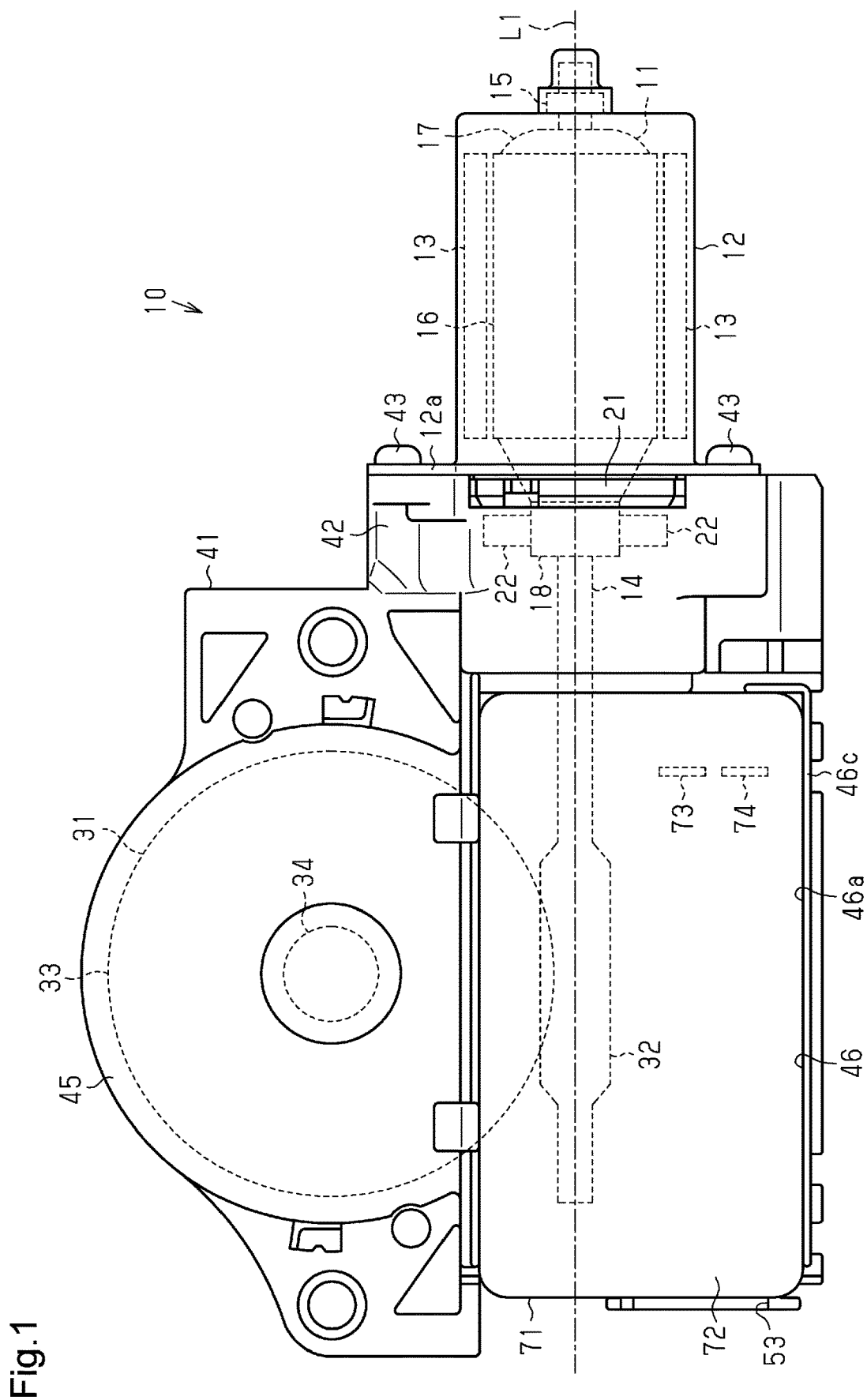
FIG. 1 is a front view of a motor according to one embodiment.

As shown in FIG. 1, a motor 10 includes a tubular yoke housing 12 (hereafter referred to as yoke 12) having a closed bottom and accommodating a rotor 11. The yoke 12 includes a flange 12a that extends outward from the open portion of the yoke 12 in the radial direction. The yoke 12 includes magnets 13 fixed to its inner surface, and the rotor 11 is rotationally arranged at the inner side of the magnets 13.

The rotor 11 includes a rotary shaft 14 arranged at the center of the yoke 12. The rotary shaft 14 has a proximal end supported by a bearing 15 arranged at the central part of the bottom of the yoke 12. An armature core 16 opposing the magnets 13 in the radial direction is fixed to the rotary shaft 14 so as to be rotatable integrally with the rotation shaft 14, and an armature coil 17 is wound around the armature core 16. A commutator 18 electrically connected to the armature coil 17 is fixed to the rotary shaft 14 at a portion closer to a distal end than the armature core 16 so as to be rotatable integrally with the rotary shaft 14. The distal end of the rotary shaft 14 projects out of the open portion of the yoke 12 (toward housing case 41, which will be described later).

Figure 2:
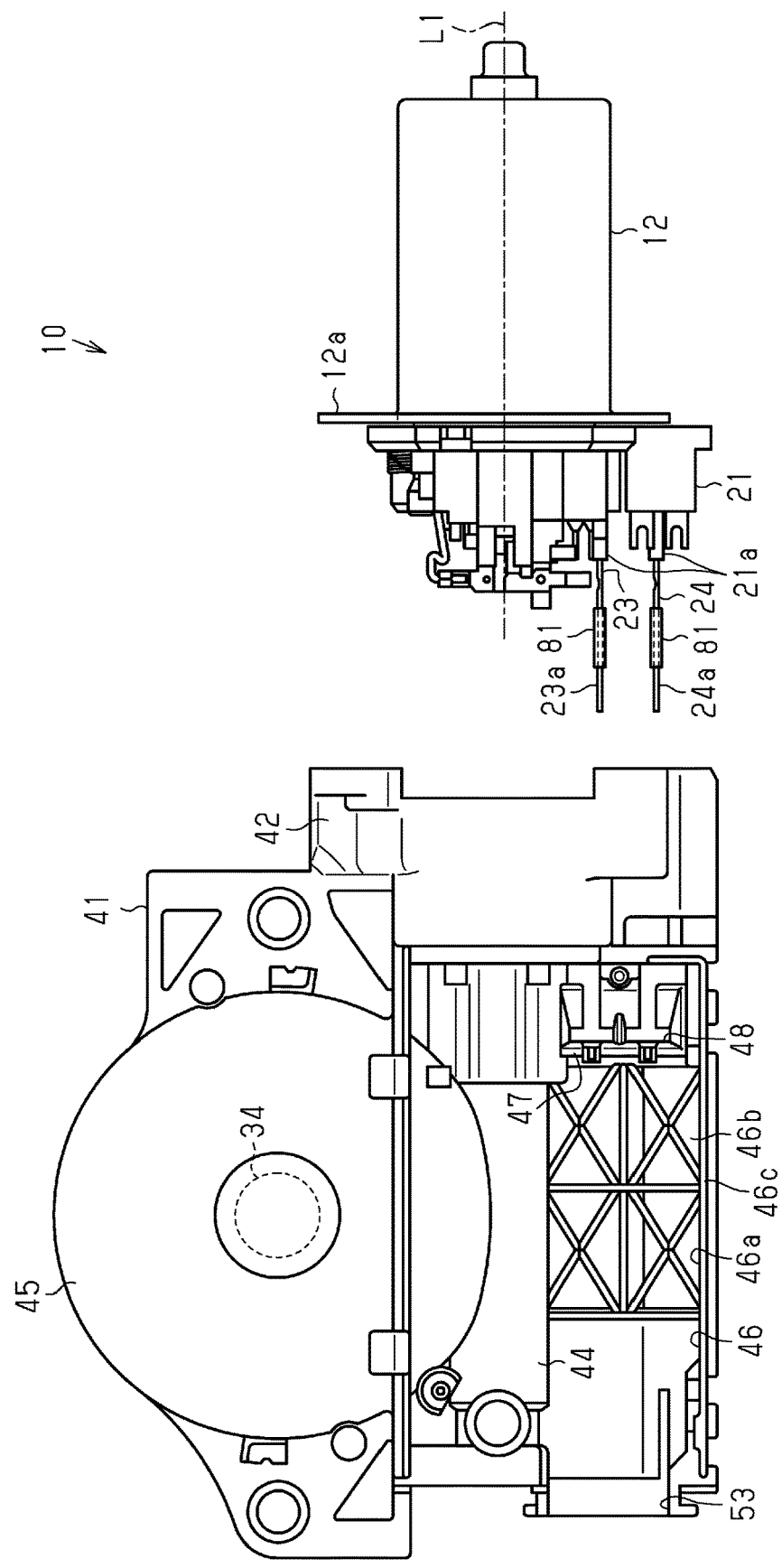
FIG. 2 is a partially exploded front view showing the motor according to the embodiment.

As shown in FIGS. 1 and 2, a brush holder 21 is fitted into the open portion of the yoke 12. The brush holder 21 of the present embodiment is made of an insulative plastic material. The rotary shaft 14 has a portion located closer to the distal end than the commutator 18 that extends through the brush holder 21. The rotary shaft 14 is supported by a bearing (not shown) held by the brush holder 21. The brush holder 21 holds power brushes 22 that slide in contact with the commutator 18.

The brush holder 21 also includes two power terminals 23, 24. In the present embodiment, the power terminals 23, 24 are formed on the plastic brush holder 21 through insert molding. The power terminals 23, 24 are each pressed out of a conductive metal plate and embedded in the brush holder 21 to be partially exposed from the brush holder 21. The distal ends of the power terminals 23, 24 are exposed from the brush holder 21 at positions separated from the rotary shaft 14 in the radial direction (positions downwardly separated from rotation axis L1 of rotary shaft 14 in FIG. 2). The distal portions of the power terminals 23, 24 exposed from the brush holder 21 extend straight in parallel with the rotation axis L1 of the rotary shaft 14 (hereafter referred to as rotation axis L1) at the side opposite to the yoke 12. The portions of the power terminals 23, 24 extending in parallel with the rotation axis L1 are referred to as terminal connection portions 23a, 24a. The portions of the power terminals 23, 24 that are located closer to the proximal ends than the terminal connection portions 23a, 24a and exposed from the brush holder 21 are electrically connected to the power brushes 22.

The motor 10 includes a plastic housing case 41 coupled to the yoke 12 to accommodate a speed reduction mechanism 31 that reduces the speed of the rotation of the rotor 11. The housing case 41 includes a fastening portion 42 at a position (right end in FIG. 2) opposed to the yoke 12 in the direction of the rotation axis L1 to fasten the housing case 41 and the yoke 12. The fastening portion 42 is shaped to extend over the flange 12a and the brush holder 21 of the yoke 12 in the direction of the rotation axis L1. The fastening portion 42 includes a recess (not shown) that accommodates a portion of the brush holder 21 projecting out of the yoke 12. The housing case 41 is coupled to the yoke 12 by fastening the flange 12a of the yoke 12 to the fastening portion 42 with screws 43 in a state in which the brush holder 21 is held between the fastening portion 42 and the yoke 12.

The housing case 41 includes a worm accommodating portion 44 that extends toward the side opposite to the yoke 12 from the fastening portion 42 in direction of the rotation axis L1. The worm accommodating portion 44 accommodates an externally threaded worm 32 that rotates integrally with the rotary shaft 14. The housing case 41 also includes a worm wheel accommodating portion 45 integrated with the worm accommodating portion 44 beside (upper side in FIG. 2) the worm accommodating portion 44. The worm wheel accommodating portion 45 rotationally accommodates a substantially disk-shaped worm wheel 33. In the present embodiment, the speed reduction mechanism 31 is a worm speed reduction mechanism formed by the worm wheel 33 and the worm 32. An output shaft 34 extends from a radially central portion of the worm wheel 33 in the axial direction of the worm wheel 33 and is rotatable integrally with the worm wheel 33. The rotation of which the speed has been reduced by the speed reduction mechanism 31 is output from the output shaft 34.

The housing case 41 also includes a substrate accommodating recess 46 at a portion adjacent to the fastening portion 42 in the direction of the rotation axis L1. The substrate accommodating recess 46 is recessed in the direction orthogonal to the rotation axis L1 and parallel to the rotation axis of the output shaft 34 (direction perpendicular to plane of FIG. 2). The substrate accommodating recess 46 of the present embodiment is rectangular and elongated in the direction of the rotation axis L1 as viewed from an open portion 46a of the substrate accommodating recess 46 in the direction orthogonal to the rotation axis L1 (i.e., state shown in FIG. 2).

The substrate accommodating recess 46 includes a partitioning wall 47 at a location adjacent to the fastening portion 42 in the substrate accommodating recess 46 and a terminal insertion portion 48 partially partitioned by the partitioning wall 47. The partitioning wall 47 is located inside the substrate accommodating recess 46 at a position that is spaced apart from the fastening portion 42 in direction of the rotation axis L1. The partitioning wall 47 projects from a bottom surface 46b of the substrate accommodating recess 46 toward the open portion 46a of the substrate accommodating recess 46. The partitioning wall 47, when viewed from the open portion 46a of the substrate accommodating recess 46 (refer to FIG. 2), extends from the worm accommodating portion 44 to a side wall 46c of the substrate accommodating recess 46 in the direction orthogonal to the direction of the rotation axis L1. The side wall 46c is a peripheral wall extending along the periphery of the substrate accommodating recess 46.

Figure 3:
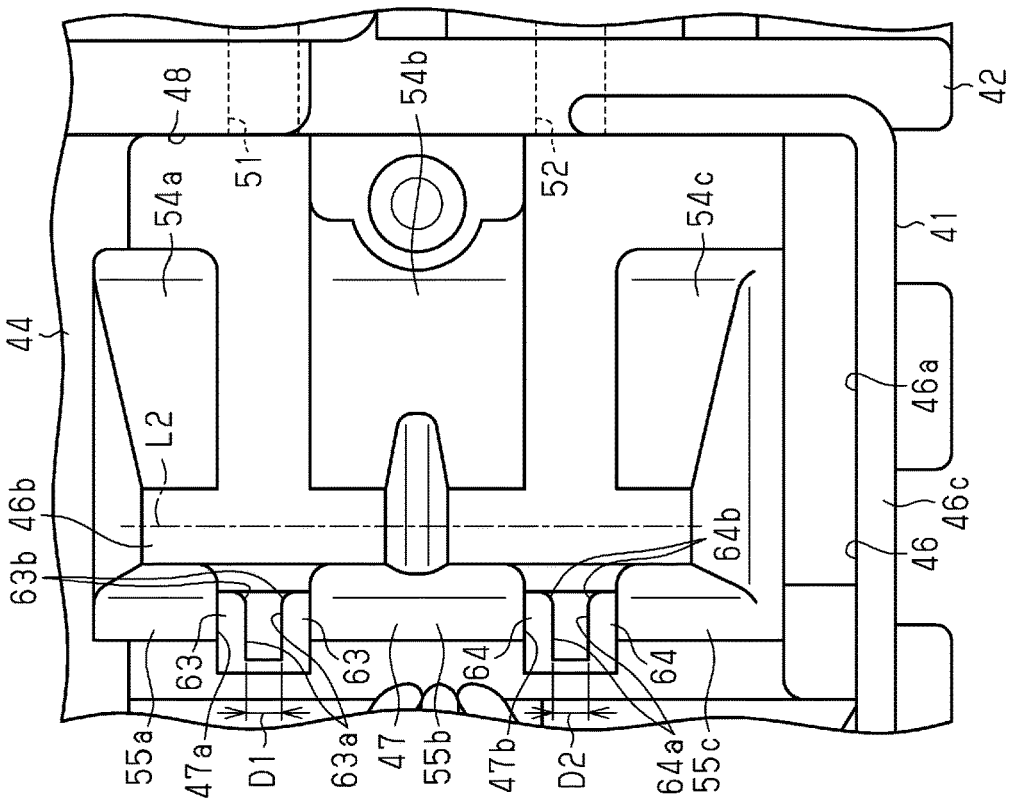
FIG. 3 is an enlarged view showing a housing case for the motor according to the embodiment.

As shown in FIGS. 2 and 3, the housing case 41 includes two terminal insertion ports 51, 52 that extend through the fastening portion 42 and are open toward the inside of the terminal insertion portion 48 in the direction of the rotation axis L1. The terminal insertion ports 51, 52 connect the terminal insertion portion 48 and the recess (not shown) in the fastening portion 42 that accommodates the brush holder 21. When viewed in the direction in which the substrate accommodating recess 46 is recessed (i.e., state shown in FIG. 2), the terminal insertion ports 51, 52 are spaced apart in the direction orthogonal to the rotation axis L1 by an interval that is the same as the interval between the terminal connection portions 23a, 24a.

Figure 4:
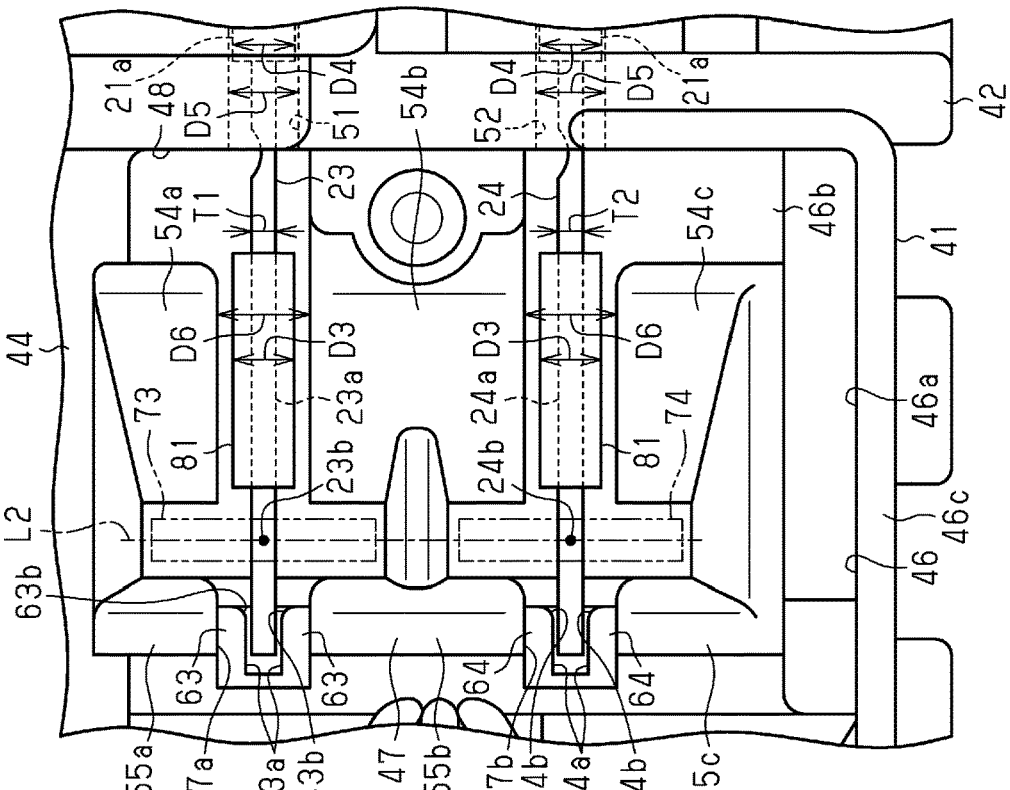
FIG. 4 is an enlarged view showing the housing case and a power terminal for the motor according to the embodiment.

As shown in FIG. 4, the terminal connection portions 23a, 24a of the power terminals 23, 24 are arranged inside the terminal insertion portion 48 (substrate accommodating recess 46) when the distal ends of the power terminals 23, 24 are inserted from the terminal insertion ports 51, 52 into the terminal insertion portion 48. The terminal connection portions 23a, 24a arranged inside the terminal insertion portion 48 extend parallel to the rotation axis L1 and to each other. The terminal connection portions 23a, 24a are, when viewed in the direction in which the substrate accommodating recess 46 is recessed, spaced apart in the direction orthogonal to the direction of the rotation axis L1. The distal ends of the terminal connection portions 23a, 24a (distal ends of power terminals 23, 24) reach the partitioning wall 47.

Figure 5:
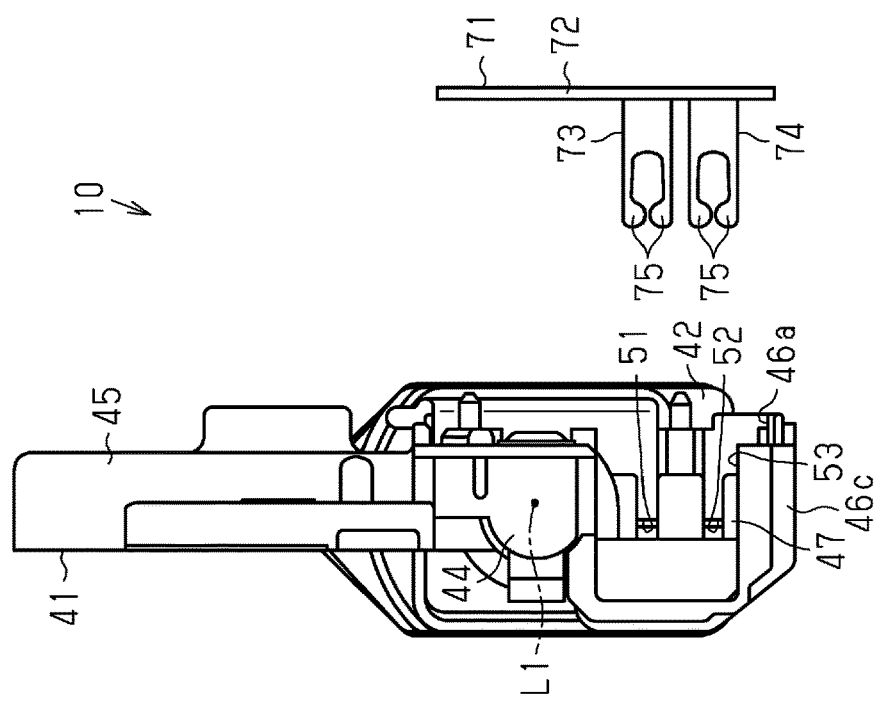
FIG. 5 is a partially exploded side view showing the motor according to the embodiment.

As shown in FIGS. 1 and 5, the substrate accommodating recess 46 accommodates a controller 71 that controls and drives the motor 10. The controller 71 includes a circuit board 72 on which electronic components are mounted. The circuit board 72 is shaped to be a flat plate, which is rectangular and slightly smaller than the open portion 46a of the substrate accommodating recess 46. The circuit board 72 is accommodated in the substrate accommodating recess 46 to substantially close the open portion 46a of the substrate accommodating recess 46. The circuit board 72 is accommodated in the substrate accommodating recess 46 in parallel with the direction of the rotation axis L1 (direction orthogonal to direction of rotation axis L1 is thickness direction of circuit board 72) so that the rotation axis of the output shaft 34 is parallel to the thickness direction of the circuit board 72. The circuit board 72 is accommodated in the substrate accommodating recess 46 so that the direction in which the substrate accommodating recess 46 is recessed corresponds to the thickness direction of the circuit board 72.

As shown in FIGS. 2 and 5, the circuit board 72 includes two terminals 73, 74 that are electrically connected to the power terminals 23, 24. The terminals 73, 74 extend from a portion of the circuit board 72 that overlaps with the terminal insertion portion 48. The terminals 73, 74 are bifurcated terminals each extending perpendicularly from the circuit board 72 and including two clamping pieces 75 at the distal ends. The terminal 73 and the terminal 74 are spaced apart by a distance that is the same as the distance between the terminal connection portion 23a and the terminal connection portion 24a in the direction orthogonal to the direction of the rotation axis L1 (vertical direction in FIG. 5).

As shown in FIGS. 4 and 5, the terminals 73, 74 are electrically connected to the terminal connection portions 23a, 24a in the direction intersecting with the direction in which the terminal connection portions 23a, 24a extend. Specifically, the terminal 73 is arranged relative to the terminal connection portion 23a in the direction orthogonal to the direction of the rotation axis L1 so that the terminal connection portion 23a is inserted between the two clamping pieces 75. The clamping pieces 75 of the terminal 73 clamp the terminal connection portion 23a. This connects the terminal 73 to the terminal connection portion 23a in the direction orthogonal to the direction of the rotation axis L1 and in the direction in which the circuit board 72 is coupled to the housing case 41. In the same manner, the terminal 74 is arranged relative to the terminal connection portion 24a in the direction orthogonal to the direction of the rotation axis L1 so that the terminal connection portion 24a is inserted between the two clamping pieces 75. The clamping pieces 75 of the terminal 74 clamp the terminal connection portion 24a. This connects the terminal 74 to the terminal connection portion 24a in the direction orthogonal to the direction of the rotation axis L1 and in the direction in which the circuit board 72 is coupled to the housing case 41. The terminal connection portion 23a includes a terminal connection position 23b where the terminal 73 is connected. The terminal connection portion 24a includes a terminal connection position 24b where the terminal 74 is connected. In the present embodiment, the terminal connection position 23b of the terminal connection portion 23a and the terminal connection position 24b of the terminal connection portion 24a are located on a straight line orthogonal to the direction of the rotation axis L1 as viewed in the direction in which the substrate accommodating recess 46 is recessed (straight line L2 shown by long single-dashed line in FIG. 4).

The circuit board 72 shown in FIGS. 1 and 5 includes a connector (not shown) to which an external connector (not shown), which is electrically connected to an external power supply device, is connected. The connector extends out of the housing case 41 through a cutout portion 53 in the side wall 46c of the substrate accommodating recess 46. The connector is electrically connected to the terminals 73, 74 of the circuit board 72.

As shown in FIGS. 3 and 4, the terminal insertion portion 48 includes projecting walls 54a, 54b, 54c that project from the bottom surface 46b of the substrate accommodating recess 46 toward the open portion 46a of the substrate accommodating recess 46 and are lined with the terminal connection portions 23a, 24a in the direction orthogonal to the direction in which the terminal connection portions 23a, 24a extend (direction of rotation axis L1 in present embodiment). The projecting walls 54a, 54b, 54c are located closer to the proximal side (right side in FIG. 4) of the power terminals 23, 24 than to the distal ends of the terminal connection positions 23b, 24b. Inside the terminal insertion portion 48, the projecting wall 54a is arranged between the worm accommodating portion 44 and the terminal connection portion 23a, the projecting wall 54b is arranged between the terminal connection portion 23a and the terminal connection portion 24a, and the projecting wall 54c is arranged between the terminal connection portion 24a and the side wall 46c.

The partitioning wall 47 includes separation grooves 47a, 47b that are recessed from the distal end to the proximal end of the partitioning wall 47 at two positions spaced apart in the direction orthogonal to the direction of the rotation axis L1. The separation grooves 47a, 47b divides the partitioning wall 47 into three parts, namely, wall segments 55a, 55b, 55c. The separation groove 47a receives the distal end of the power terminal 23, and the separation groove 47b receives the distal end of the power terminal 24. The wall segments 55a, 55b, 55c are lined with the terminal connection portions 23a, 24a in the direction orthogonal to the direction in which the terminal connection portions 23a, 24a extend (vertical direction in FIG. 4).

Inside the substrate accommodating recess 46, the wall segment 55a is arranged between the worm accommodating portion 44 and the terminal connection portion 23a, the wall segment 55b is arranged between the terminal connection portion 23a and the terminal connection portion 24a, and the wall segment 55c is arranged between the terminal connection portion 24a and the side wall 46c. Thus, when viewed from the open portion 46a of the substrate accommodating recess 46 (direction in which substrate accommodating recess 46 is recessed), the projecting walls 54a, 54b are arranged at two sides of the terminal connection portion 23a in the direction orthogonal to the direction in which the terminal connection portion 23a extends. The wall segments 55a, 55b are arranged at two sides of the terminal connection portion 23a in the direction orthogonal to the direction in which the terminal connection portion 23a extends. The projecting walls 54a, 54b and the wall segments 55a, 55b are located at two sides of the terminal connection position 23b of the terminal connection portion 23a in the direction in which the terminal connection portion 23a extends. Further, when viewed from the open portion 46a of the substrate accommodating recess 46, the projecting walls 54b, 54c are arranged at two sides of the terminal connection portion 24a in the direction orthogonal to the direction in which the terminal connection portion 24a extends. The wall segments 55b, 55c are arranged at two sides of the terminal connection portion 24a in the direction orthogonal to the direction in which the terminal connection portion 24a extends. The projecting walls 54b, 54c and the wall segments 55b, 55c are located at two sides of the terminal connection position 24b of the terminal connection portion 24a in the direction in which the terminal connection portion 24a extends.

The projecting walls 54a, 54b, 54c and the partitioning wall 47 (i.e., wall segments 55a, 55b, 55c) have distal ends (ends opposite to bottom surface 46b of substrate accommodating recess 46) that are located closer to the open portion 46a of the substrate accommodating recess 46 (upward from plane of FIG. 4) than the terminal connection portions 23a, 24a.

The housing case 41 includes two restriction portions 63 inside the substrate accommodating recess 46. The restriction portions 63 restrict the position of the portion of the terminal connection portion 23a extending toward the distal end from the terminal connection position 23b in the direction orthogonal to the direction in which the terminal connection portion 23a extends (vertical direction in FIG. 4). The restriction portions 63 are arranged in the separation groove 47a between the wall segment 55a and the terminal connection portion 23a and between the wall segment 55b and the terminal connection portion 23a. The restriction portions 63 are arranged integrally with the side surfaces of the wall segments 55a, 55b located toward the terminal connection portion 23a. The restriction portions 63 each oppose the section of the terminal connection portion 23a extending toward the distal end from the terminal connection position 23b in the direction orthogonal to the direction in which the terminal connection portion 23a extends (vertical direction in FIG. 4). The side surfaces of the restriction portions 63 opposed to the terminal connection portion 23a each include a restriction surface 63a located at a fixed distance from the terminal connection portion 23a. The restriction surface 63a of one of the restriction portions 63 and the restriction surface 63a of the other restriction portion 63 are parallel to each other and shaped to be flat and parallel to the direction of the rotation axis L1. Thus, the distance D1 between the restriction portions 63 at the two sides of the terminal connection portions 23a (that is, distance between restriction surfaces 63a) is a fixed value in the direction in which the terminal connection portion 24a extends (refer to FIG. 3). The distance D1 is slightly greater than the thickness T1 of the terminal connection portion 23a. The distance D1 is set in accordance with the dimensions and shape of the two clamping pieces 75 of the terminal 73 connected to the terminal connection portion 23a. Specifically, the distance D1 is set so that as long as the distal end of the terminal connection portion 23a is arranged between the two restriction surfaces 63a, the rounded distal ends of the clamping pieces 75 will insert the terminal connection portion 23a into the space between the two clamping pieces 75 when coupling the controller 71.

As shown in FIGS. 3 and 4, the ends (right ends located closer to terminal insertion port 51 in FIG. 4) of the restriction portions 63 at the side opposite to the distal end of the power terminal 23 form an inlet 63b. The inlet 63b is shaped so that the distance to the terminal connection portion 23a (distance between inlet 63b and terminal connection portion 23a in direction orthogonal to direction in which terminal connection portion 23a extends) is gradually reduced from a first end (opposite to distal end of power terminal 23) of the restriction portion 63 toward the distal end of power terminal 23 in the direction in which the terminal connection portion 23a extends. In the present embodiment, the restriction portions 63 at the end opposite to the distal end of the power terminal 23 are shaped to be arcuate at the sections adjacent to the terminal connection portion 23a, and the arcuate sections define the inlet 63b. The inlet 63b of the restriction portions 63 at the ends of the restriction portions 63 opposite to the distal end of the power terminal 23 reduces the width of the space to the two sides of the terminal connection portion 23a toward the distal end of the power terminal 23.

The housing case 41 includes two restriction portions 64 inside the substrate accommodating recess 46. The restriction portions 64 restrict the position of the portion of the terminal connection portion 24a extending toward the distal end from the terminal connection position 24b in the direction orthogonal to the direction in which the terminal connection portion 24a extends (vertical direction in FIG. 4). The restriction portions 64 are arranged in the separation groove 47b between the wall segment 55b and the terminal connection portion 24a and between the wall segment 55c and the terminal connection portion 24a. The restriction portions 64 are arranged integrally with the side surfaces of the wall segments 55b, 55d located toward the terminal connection portion 24a. The restriction portions 64 each oppose the section of the terminal connection portion 24a extending toward the distal end from the terminal connection position 24b in the direction orthogonal to the direction in which the terminal connection portion 24a extends (vertical direction in FIG. 4).

The restriction portions 64 arranged at two sides of the terminal connection portion 24a have the same structure as the restriction portions 63 arranged at two sides of the terminal connection portion 23a. The side surfaces of the restriction portions 64 opposed to the terminal connection portion 24a each include a restriction surface 64a located at a fixed distance from the terminal connection portion 24a. The distance D2 between the restriction portions 64 at the two sides of the terminal connection portions 24a (that is, distance between restriction surfaces 64a) is a fixed value in the direction in which the terminal connection portion 24a extends. The distance D2 is slightly greater than the thickness T2 of the terminal connection portion 24a. The distance D2 is set in accordance with the dimensions and shape of the two clamping pieces 75 of the terminal 74 connected to the terminal connection portion 24a. Specifically, the distance D2 is set so that as long as the distal end of the terminal connection portion 24a is arranged between the two restriction surfaces 64a, the rounded distal ends of the clamping pieces 75 will insert the terminal connection portion 24a into the space between the two clamping pieces 75 when coupling the controller 71.

The ends (right ends located closer to terminal insertion port 52 in FIG. 4) of the restriction portions 64 at the side opposite to the distal end of the power terminal 24 form an inlet 64b with the same structure as the structure of the inlet 63b. The inlet 64b is shaped to be arcuate so that the distance to the terminal connection portion 24a (distance between inlet 64b and terminal connection portion 24a in direction orthogonal to direction in which terminal connection portion 24a extends) is gradually reduced from a first end (opposite to distal end of power terminal 24) of the restriction portion 64 toward the distal end of power terminal 24 in the direction in which the terminal connection portion 24a extends.

As shown in FIG. 4, the portions of the terminal connection portions 23a, 24a located toward the proximal ends from the terminal connection positions 23b, 24b, where the terminal 73 are connected, are covered by noise reduction members 81 that absorb and reduce noise.

Figure 6:
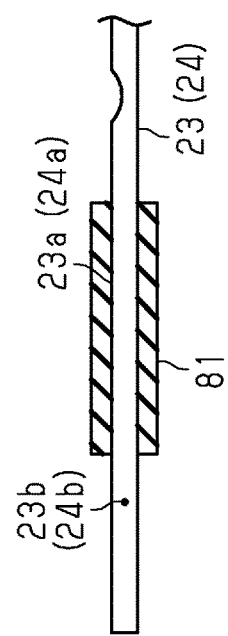
FIG. 6 is a cross-sectional view showing part of the power terminal and a noise reduction member according to the embodiment.

Specifically, as shown in FIG. 6, the noise reduction member 81 covers the terminal connection portions 23a, 24a while allowing the terminal connection portions 23a, 24a to be bent. The noise reduction member 81 in the present embodiment is an elastic member made of rubber in which ferrite powder serving as a noise absorption material is mixed with a rubber material. The noise reduction member 81 is arranged in contact with the terminal connection portions 23a, 24a without any gaps.

The noise reduction member 81 is shaped so as to be passable through the terminal insertion ports 51, 52. Specifically, the noise reduction member 81 is formed to be included in the contours of the terminal insertion ports 51, 52 as viewed in the direction in which the terminal connection portions 23a, 24a extend. In the present embodiment, the brush holder 21 includes holding portions 21a that extend in the same direction as the direction in which the terminal connection portions 23a, 24a extend. The holding portions 21a hold the proximal ends of the terminal connection portions 23a, 24a and are inserted into the terminal insertion ports 51, 52. The width D3 of the noise reduction member 81 is the same as the width D4 of the holding portion 21a in the direction orthogonal to the rotation axis L1 as viewed in the direction in which the substrate accommodating recess 46 is recessed (refer to FIG. 4). The width D3 is set to be slightly less than width D5 of the terminal insertion ports 51, 52. The width D3 of the noise reduction member 81 is set to be less than width D6 between the adjacent projecting walls 54a to 54c.

As shown in FIGS. 1 and 2, in the motor 10, current from the external connector, which is connected to the controller 71, is supplied to the rotor 11 through the terminals 73, 74, the power terminals 23, 24, and the power brushes 22. This rotates the rotor 11. The rotation of the rotor 11 is reduced in speed by the worm 32, which is rotated integrally with the rotary shaft 14, and the worm wheel 33, which is meshed with the worm 32, and output from the output shaft 34.

The operation of the present embodiment will now be described.

As shown in FIG. 2, when the yoke 12 is coupled to the housing case 41 to assemble the motor 10, the yoke 12 having the open portion into which the brush holder 21 is fitted is coupled to the housing case 41 so that the brush holder 21 is held between the flange 12a and the fastening portion 42. The power terminals 23, 24 held by the brush holder 21 include the terminal connection portions 23a, 24a located toward the distal ends. The terminal connection portions 23a, 24a are inserted from the terminal insertion ports 51, 52 into the terminal insertion portion 48 of the substrate accommodating recess 46. The terminal connection portions 23a, 24a of the power terminals 23, 24 and the noise reduction members 81 are arranged inside the terminal insertion portion 48 of the substrate accommodating recess 46. The restriction portions 63, 64 receive the distal ends of the power terminals 23, 24.

The power terminals 23, 24 are arranged at positions where the terminal connection portions 23a, 24a are connectable to the terminals 73, 74. Further, the positions of portions located toward the distal ends from the terminal connection positions 23b, 24b are restricted by the restriction portions 63, 64. In this state, the circuit board 72 is accommodated in the substrate accommodating recess 46 in the direction orthogonal to the direction of the rotation axis L1 (namely, direction in which substrate accommodating recess 46 is recessed). That is, in a state in which the terminal connection positions 23b, 24b are located at positions that allow for clamping by the terminals 73, 74, which are inserted into the substrate accommodating recess 46 together with the circuit board 72, the terminals 73, 74 are inserted into the terminal insertion portion 48 from the direction orthogonal to the direction of the rotation axis L1. The terminal 73 clamps the terminal connection portion 23a and the terminal 74 clamps the terminal connection portion 24a so that the terminal 73 is electrically connected to the power terminal 23 and the terminal 74 is electrically connected to the power terminal 24.

The embodiment has the following advantages.

(1) Sections of the terminal connection portions 23a, 24a located toward the proximal ends from the terminal connection positions 23b, 24b, where the terminals 73, 74 of the circuit board 72 are connected, are covered by the noise reduction members 81. This reduces noise generated by the power brushes 22 and transmitted to the circuit board 72, the external power supply device, and the like. This entirely reduces the occupied size in comparison with a noise reduction member arranged outside the motor 10 and allows for miniaturization.

(2) The noise reduction members 81 cover the terminal connection portions 23a, 24a while allowing the terminal connection portions 23a, 24a to be bent. Thus, the terminal connection portions 23a, 24a may be bent when connected to the terminals 73, 74, thereby allowing for easy connection without requiring high dimensional accuracy. In other words, a noise reduction member that does not allow the terminal connection portions 23a, 24a to be bent will require high dimensional accuracy. Otherwise, the terminal connection portions 23a, 24a cannot be easily connected to the terminals 73, 74. The noise reduction members 81 avoid such a situation.

(3) The noise reduction members 81 are elastic and arranged in contact with the terminal connection portions 23a, 24a. This allows the terminal connection portions 23a, 24a to be bent.

(4) The noise reduction members 81 are members made of rubber in which ferrite powder serving as a noise absorption material is mixed with a rubber material. Thus, the terminal connection portions 23a, 24a can be easily bent.

(5) The housing case 41 includes the terminal insertion ports 51, 52 that extend through the housing case 41 in the same direction as the direction in which the terminal connection portions 23a, 24a extend. The terminal connection portions 23a, 24a are inserted into the terminal insertion ports 51, 52. The noise reduction members 81 are shaped so as to be passable through the terminal insertion ports 51, 52. This allows the housing case 41 and the brush holder 21 to be coupled in a state in which the noise reduction members 81 are fixed to the terminal connection portions 23a, 24a. Thus, the coupling is facilitated.

The present embodiment may be modified as described below. The present embodiment and the following modifications can be combined as long as the combined modifications are not in contradiction.

In the above embodiment, the noise reduction members 81 are elastic and arranged in contact with the terminal connection portions 23a, 24a. Instead, noise reduction members may be fixed to the substrate accommodating recess 46 and arranged so that gaps from the terminal connection portions 23a, 24a are provided.

Figures 7, 8:
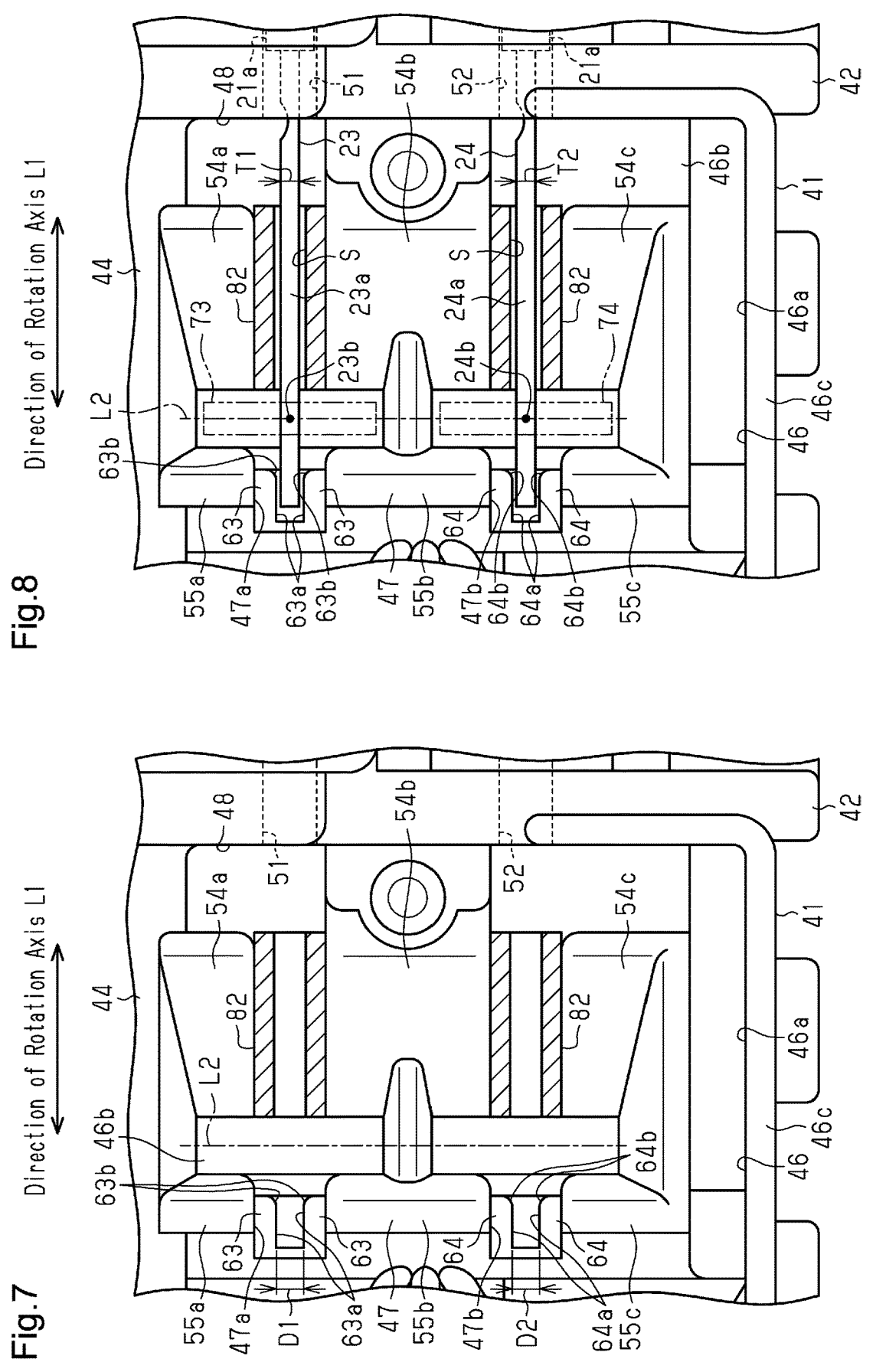

Specifically, noise reduction members may be modified as shown in FIGS. 7 and 8. In this example, noise reduction members 82 may be fixed inside the substrate accommodating recess 46 before insertion of the terminal connection portions 23a, 24a. The noise reduction members 82 are tubular and include a central hole into which the terminal connection portions 23a, 24a can be loosely fitted. The noise reduction members 82 are fixed between the adjacent projecting walls 54a to 54c. The noise reduction members 82 include a gap S from the inserted and arranged terminal connection portions 23a, 24a. This allows the terminal connection portions 23a, 24a to be bent even when the noise reduction members 82 are hard members that do not contain a rubber material or the like.

In the above embodiment, the noise reduction members 81 cover the terminal connection portions 23a, 24a while allowing the terminal connection portions 23a, 24a to be bent. Instead, noise reduction members may be hard members that do not contain a rubber material or the like, and the noise reduction members may be arranged in contact with the terminal connection portions 23a, 24a.

In the above embodiment, the noise reduction members 81 are rubber members in which ferrite powder serving as a noise absorption material is mixed with a rubber material. Instead, the members may be made of an elastic non-rubber material. The noise reduction members may include elastic members made of plastic in which ferrite powder serving as a noise absorption material is mixed with a soft plastic material.

In the above embodiment, the noise reduction members 81 are configured to absorb noise. However, any noise reduction member may be used as long as noise transmitted to the outside can be reduced.

Figure 9:
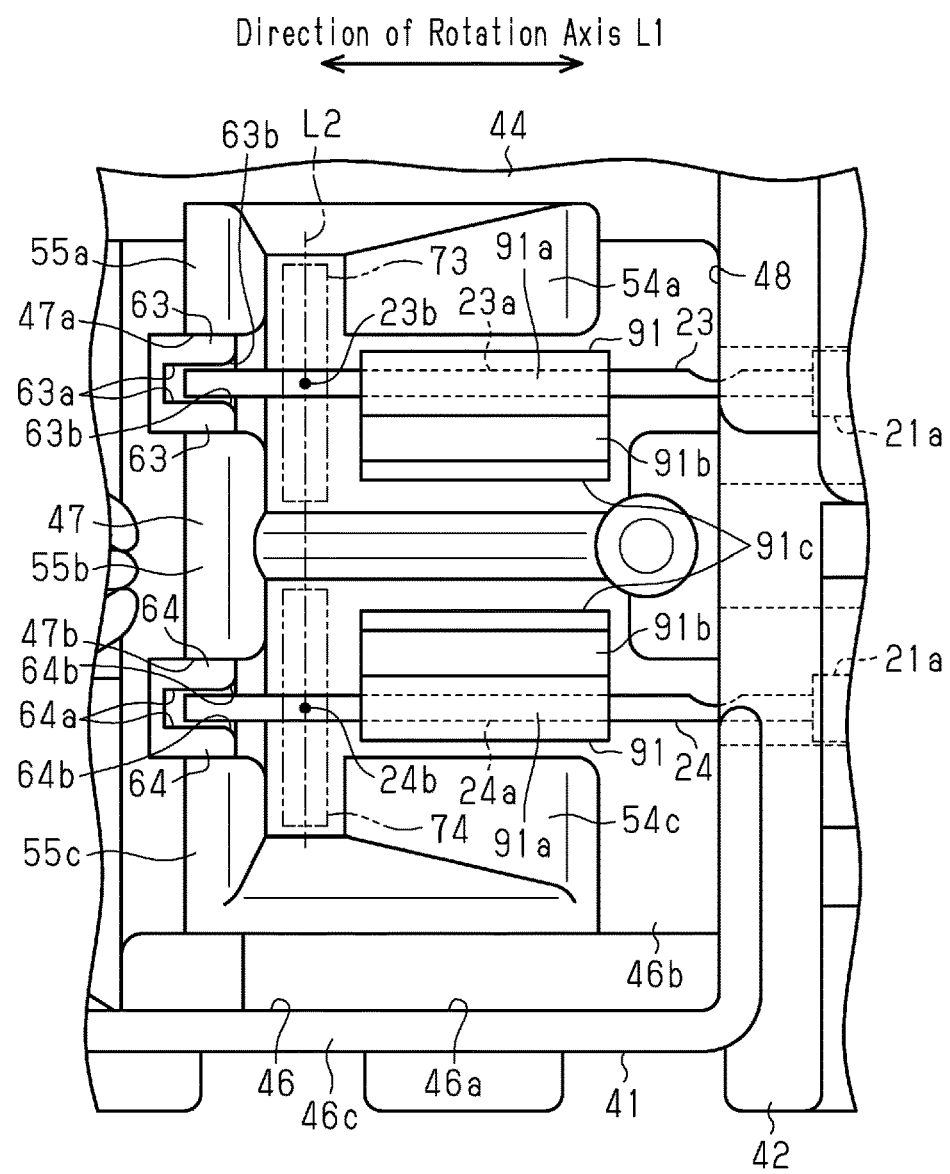
FIG. 9 is an enlarged view showing a housing case and a power terminal for a motor in the modification.
Figure 10:
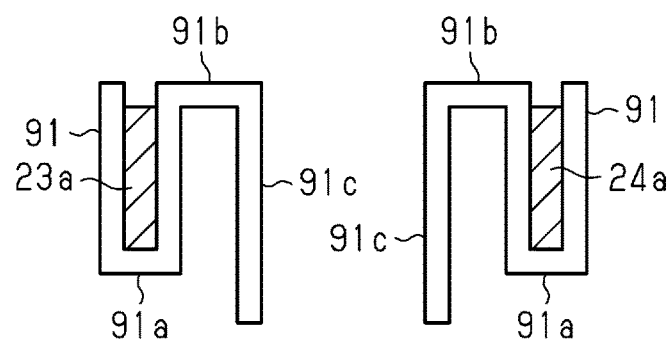
FIG. 10 is a cross-sectional view showing part of the power terminal and circuit members in the modification.

As shown in FIGS. 9 and 10, noise reduction members may include circuit members 91 arranged between the adjacent terminal connection portions 23a, 24a to increase mutual inductance and capacitance.

Specifically, the circuit members 91 are formed by a bent metal plate. The circuit members 91 include, as viewed in the direction in which the terminal connection portions 23a, 24a extend (refer to FIG. 10), substantially U-shaped press-fit portions 91a into which the terminal connection portions 23a, 24a are press-fitted, extended portions 91b that are bent from one end of the corresponding press-fit portion 91a to extend sideward and toward each other, and opposed portions 91c that are bent from the extended portions 91b and opposed toward each other.

With this structure, the circuit members 91 increase mutual inductance and capacitance and reduce a common-mode noise. The circuit members 91, formed by a bent metal plate, are easily prepared by performing pressing. The circuit members 91 include the press-fit portions 91a into which the terminal connection portions 23a, 24a are press-fitted so that the terminal connection portions 23a, 24a are easily fixed without using other parts or the like. With this structure, multiple types of circuit members 91 may be used to easily change the opposed areas and opposed distance of the opposed portions 91c of the circuit members 91. This will easily change the mutual inductance and capacitance and readily reduce a common-mode noise in a preferred manner.

The press-fit portions 91a of the circuit members 91 are configured so that the distance between the two parallel walls is set to allow the terminal connection portions 23a, 24a to be press-fitted. Alternatively, press-fit portions of any structure may be used as long as the terminal connection portions 23a, 24a can be press-fitted.

Figure 11:
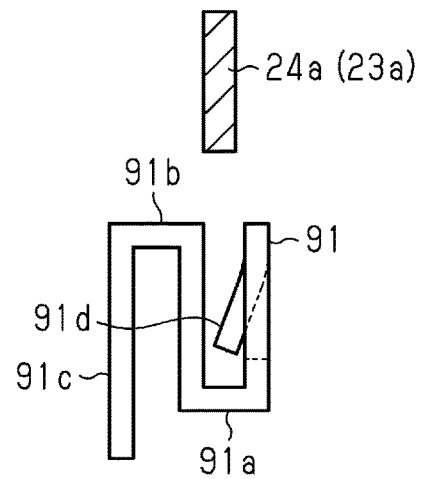
FIG. 11 is another cross-sectional view showing part of the power terminal and the circuit members in the modification.
Figure 12:
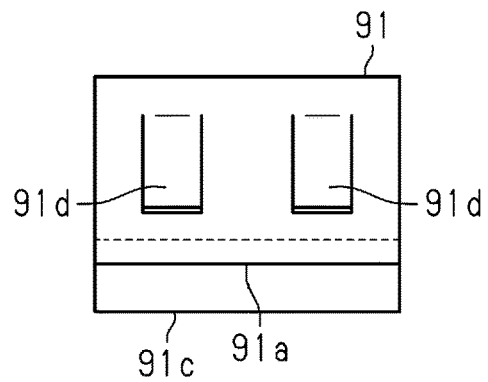
FIG. 12 is a side view of the circuit member in the modification.
Figure 13:
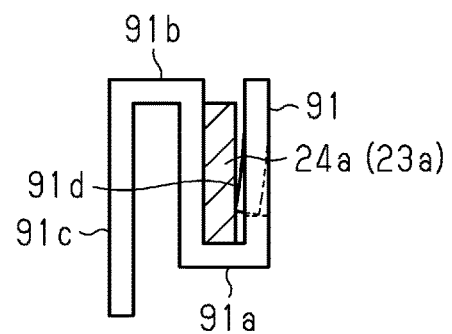
FIG. 13 is another cross-sectional view showing part of the power terminal and the circuit member in the modification.

As shown in FIGS. 11 to 13, the press-fit portion 91a may be substantially U-shaped as viewed in the direction in which the terminal connection portions 23a, 24a extend (refer to FIG. 10) and include a press portion 91d that projects inward from at least one of the two parallel walls. The press portions 91d function to press the terminal connection portions 23a, 24a so that the terminal connection portions 23a, 24a are press-fitted into the press-fit portions 91a. The press portion 91d in this example projects inward from one of the parallel walls. Alternatively, any other structure having the same function may be used. Two press portions 91d are arranged in this example. Instead, one or more than two press portions may be arranged. The circuit members 91 may have a structure other than the press-fit portions 91a obtained through swaging, welding, screwing, or the like to fix the terminal connection portions 23a, 24a. The circuit members 91 are formed by a bent metal plate. Instead, other shapes such as a block may be used.

In the above embodiment, the noise reduction members 81 are shaped so as to be passable through the terminal insertion ports 51, 52. Instead, the noise reduction members 81 may be shaped not to pass through the terminal insertion ports 51, 52. In this case, the terminal connection portions 23a, 24a need to pass through the noise reduction members 81 as well as the terminal insertion ports 51, 52 during coupling.

While the present disclosure is described with reference to examples, the present disclosure is not limited to the example or the configuration of the example. The present disclosure includes various variations and modifications within an equivalent range. In addition, various combinations and forms and other combinations and forms, which include only one element or more, shall be within the scope or a range of ideas of the present disclosure.

The invention claimed is:

1. A motor, comprising:
   a tubular yoke housing having a closed bottom and accommodating a rotor;
   a brush holder fitted into an open portion of the yoke housing, wherein the brush holder holds a power brush that supplies power to the rotor and a power terminal that is electrically connected to the power brush;
   a housing case coupled to the open portion of the yoke housing, wherein the housing case includes a substrate accommodating recess into which a distal end of the power terminal is inserted, and the housing case accommodates a speed reduction mechanism that reduces rotation of the rotor in speed; and
   a circuit board accommodated in the substrate accommodating recess and including a terminal electrically connected to the power terminal inside the substrate accommodating recess, wherein
   the power terminal includes a terminal connection portion that extends straight and is arranged in the substrate accommodating recess,
   the terminal includes a bifurcated terminal electrically connected to the terminal connection portion in a direction intersecting with a direction in which the terminal connection portion extends, and
   the terminal connection portion includes a section that is located toward a proximal end from a terminal connection position, where the terminal is connected, and covered by a noise reduction member that reduces noise.

2. The motor according to claim 1, wherein the noise reduction member covers the terminal connection portion while allowing the terminal connection portion to be bent.

3. The motor according to claim 2, wherein the noise reduction member is elastic and arranged in contact with the terminal connection portion.

4. The motor according to claim 3, wherein the noise reduction member includes a rubber member in which a noise absorption material is mixed with a rubber material.

5. The motor according to claim 2, wherein the noise reduction member is fixed to the substrate accommodating recess and arranged so that a gap from the terminal connection portion is provided.

6. The motor according to claim 1, wherein the terminal connection portion is one of two terminal connection portions, and the noise reduction member includes a circuit member arranged between the terminal connection portions, which are lined next to each other, to increase mutual inductance and capacitance.

7. The motor according to claim 6, wherein the circuit member is formed by a bent metal plate.

8. The motor according to claim 6, wherein the circuit member includes a press-fit portion into which the terminal connection portion is press-fitted.

9. The motor according to claim 1, wherein the housing case includes a terminal insertion port that extends through the housing case in the same direction as the direction in which the terminal connection portion extends, and the terminal connection portion is inserted through the terminal insertion port, and the noise reduction member is shaped so as to be passable through the terminal insertion port.

* * * * *

UNITED STATES PATENT AND TRADEMARK OFFICE
CERTIFICATE OF CORRECTION

Page 1 of 1

PATENT NO. : 11,228,230 B2
APPLICATION NO. : 17/050589
DATED : January 18, 2022
INVENTOR(S) : Kousuke Yamaura, Yoshiki Matsushita and Kazuto Kitou It is certified that error appears in the above-identified patent and that said Letters Patent is hereby corrected as shown below:

On the Title Page

The Priority information is missing. Please add the following:
-- (30) Foreign Application Priority Data
June 20, 2018 (JP)............2018-117191
November 21, 2018 (JP)............2018-218277 --

Signed and Sealed this
Nineteenth Day of April, 2022

Katherine Kelly Vidal
*Director of the United States Patent and Trademark Office*